United States Patent
Takashige et al.

(10) Patent No.: US 8,279,878 B2
(45) Date of Patent: Oct. 2, 2012

(54) METHOD FOR CONFIGURING VIRTUAL NETWORK AND NETWORK SYSTEM

(75) Inventors: Souichi Takashige, Hachiouji (JP); Yoko Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1108 days.

(21) Appl. No.: 12/124,495

(22) Filed: May 21, 2008

(65) Prior Publication Data

US 2008/0298274 A1   Dec. 4, 2008

(30) Foreign Application Priority Data

May 24, 2007   (JP) ................................. 2007-137754

(51) Int. Cl.
  *H04L 12/28*   (2006.01)
(52) U.S. Cl. ........................................ 370/397; 370/400
(58) Field of Classification Search ........................ None
  See application file for complete search history.

(56) References Cited

U.S. PATENT DOCUMENTS

| | | | |
|---|---|---|---|
| 7,591,011 B1 * | 9/2009 | Droux et al. ................... | 726/13 |
| 2003/0056020 A1 * | 3/2003 | Chaudhry et al. ............ | 709/313 |

FOREIGN PATENT DOCUMENTS

JP   2005-252333   9/2005

OTHER PUBLICATIONS

Part 3: Carrier Sense Multiple Access with Collision Detection (CSMA/CD) Access Method and Physical Layer Specifications, 2005 IEEE.

"Design and Implementation of PM: a Communication Library for Workstation Cluster" H. Tezuka, et al., pp. 41-48.

"Network Trunking for PM/Ethernet Administrator's Guide", http://www.pccluster.org/score/html/en/reference/pm.

Thomas Davis, et al. "Ethernet Bonding Driver", Oct. 2000., http://www.linux.or.jp/JF/JFdocs/kernel-docs-2.4/networking/bonding.txt>.

* cited by examiner

*Primary Examiner* — Melanie Jagannathan
(74) *Attorney, Agent, or Firm* — Mattingly & Malur, PC

(57) ABSTRACT

A first computer stores a correspondence between a virtual channel and a physical channel (s) in physical channel information and transmits the correspondence between the virtual channel and the physical channel (s) to a second computer having a virtual network interface to which a data transmission instruction is addressed. Upon receiving the correspondence between the virtual channel and the physical channel (s), the second computer stores the received correspondence in the physical channel information. The first computer transmits data in accordance with the data transmission instruction, using one or more physical channels associated with the virtual channel, based on the correspondence stored.

5 Claims, 10 Drawing Sheets

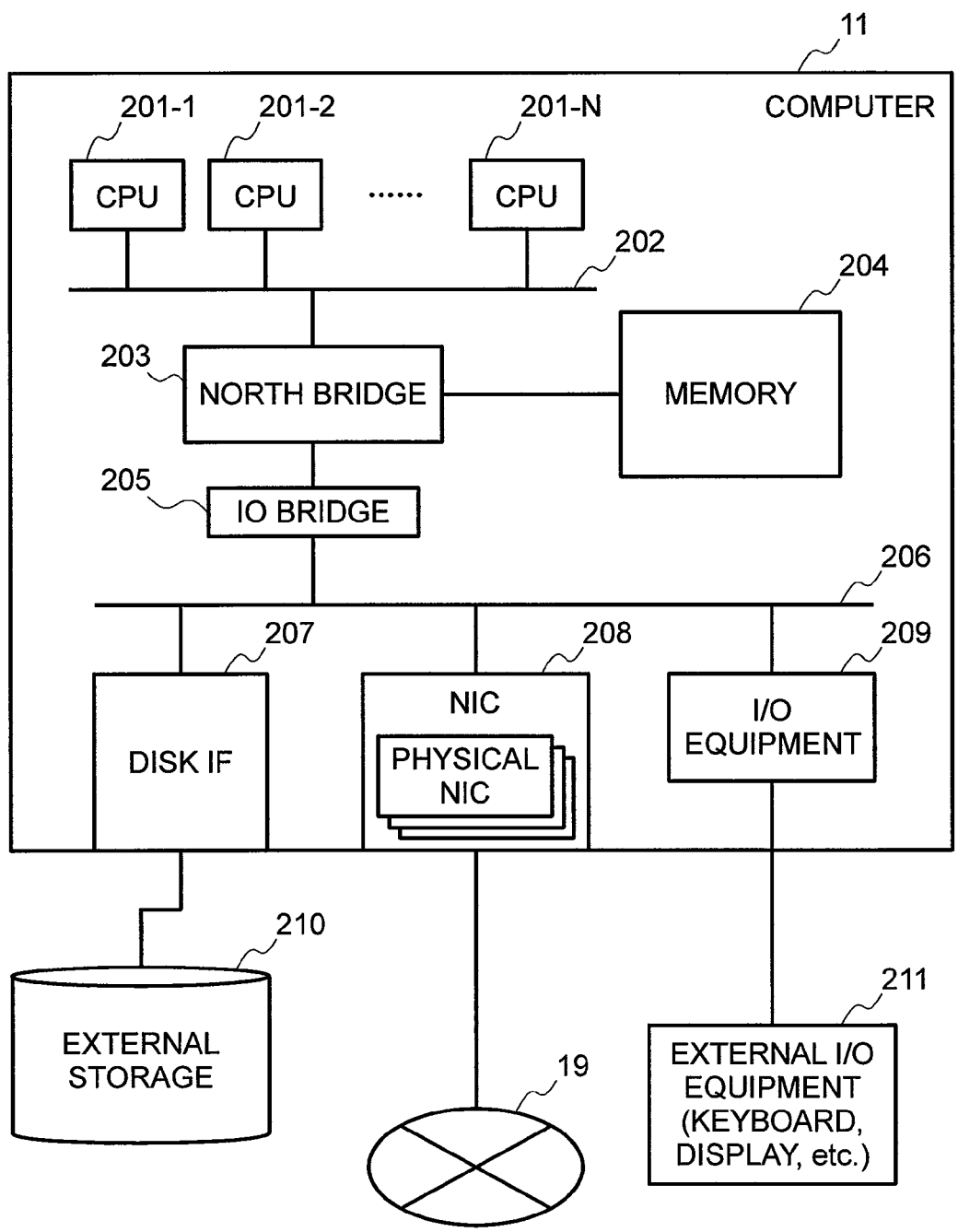

FIG.3

Virtual Channel Table 16

| Its Own Computer's Virtual Network Address (301) | Other Computer's Virtual Network Address (302) | Virtual Channel ID (303) | Virtual Channel Priority Control Information (304) | | Virtual Channel Use Frequency (305) |
|---|---|---|---|---|---|
| | | | No. of Physical Channels Parallelized | Network Weighting | |
| VMAC1 | VMAC2 | 1 | 2 | 10 | 40/sec |
| VMAC1 | VMAC4 | 2 | 2 | 20 | 20/sec |
| VMAC3 | VMAC2 | 3 | 2 | 10 | 50/sec |
| ⋮ | ⋮ | ⋮ | ⋮ | ⋮ | ⋮ |

FIG.4

Physical Channel Table 17

| Its Own Computer's Physical Network Address (401) | Other Computer's Physical Network Address (402) | Virtual Channel IDs Allocable (403) | Virtual Channel ID Allocated (404) |
|---|---|---|---|
| PMAC1 | PMAC2 | 1, 3 | 1 |
| PMAC1 | PMAC4 | 1, 3 | 1 |
| PMAC3 | PMAC2 | 1, 3 | 3 |
| PMAC3 | PMAC4 | 1, 3 | |
| ⋮ | ⋮ | ⋮ | ⋮ |

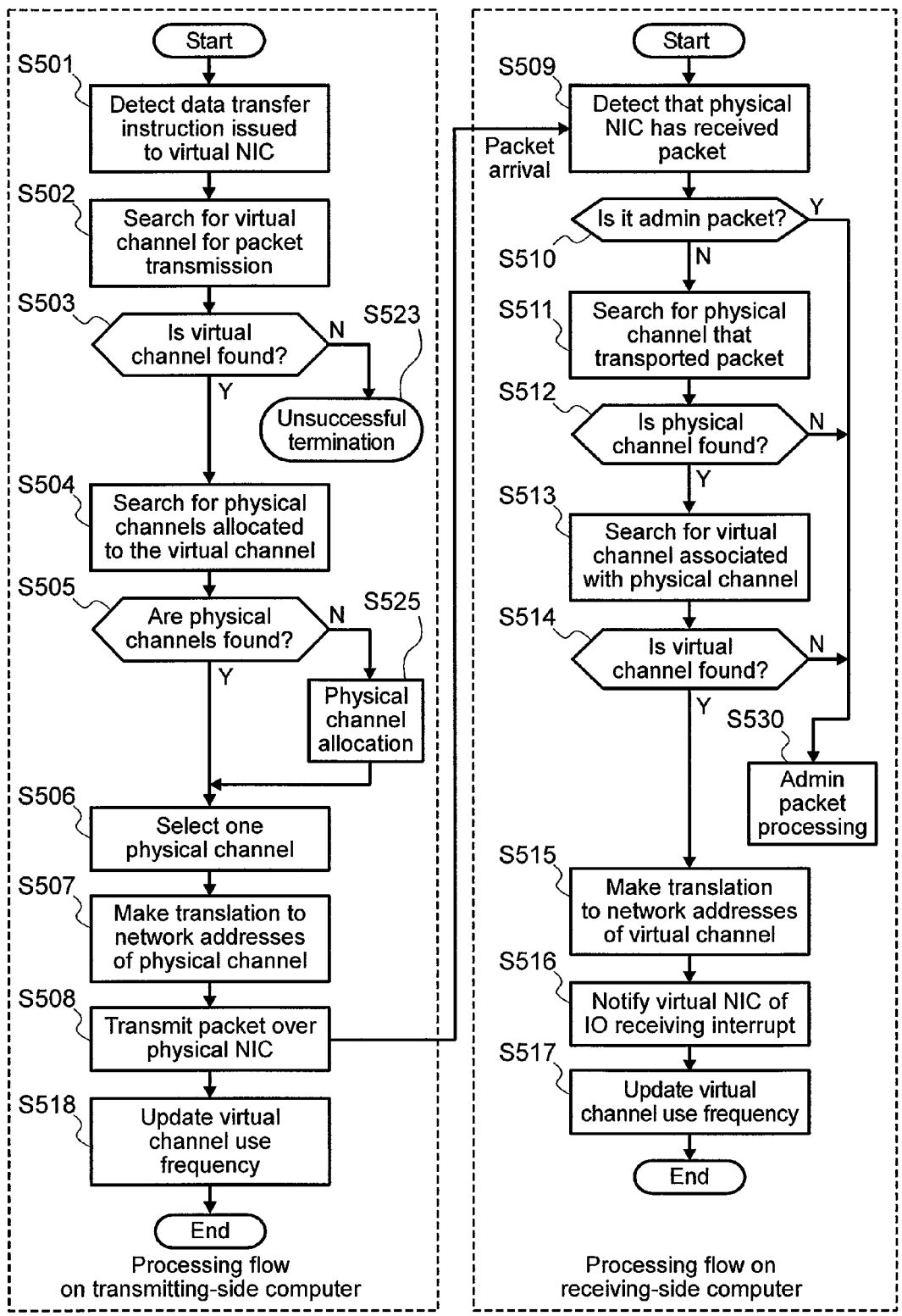

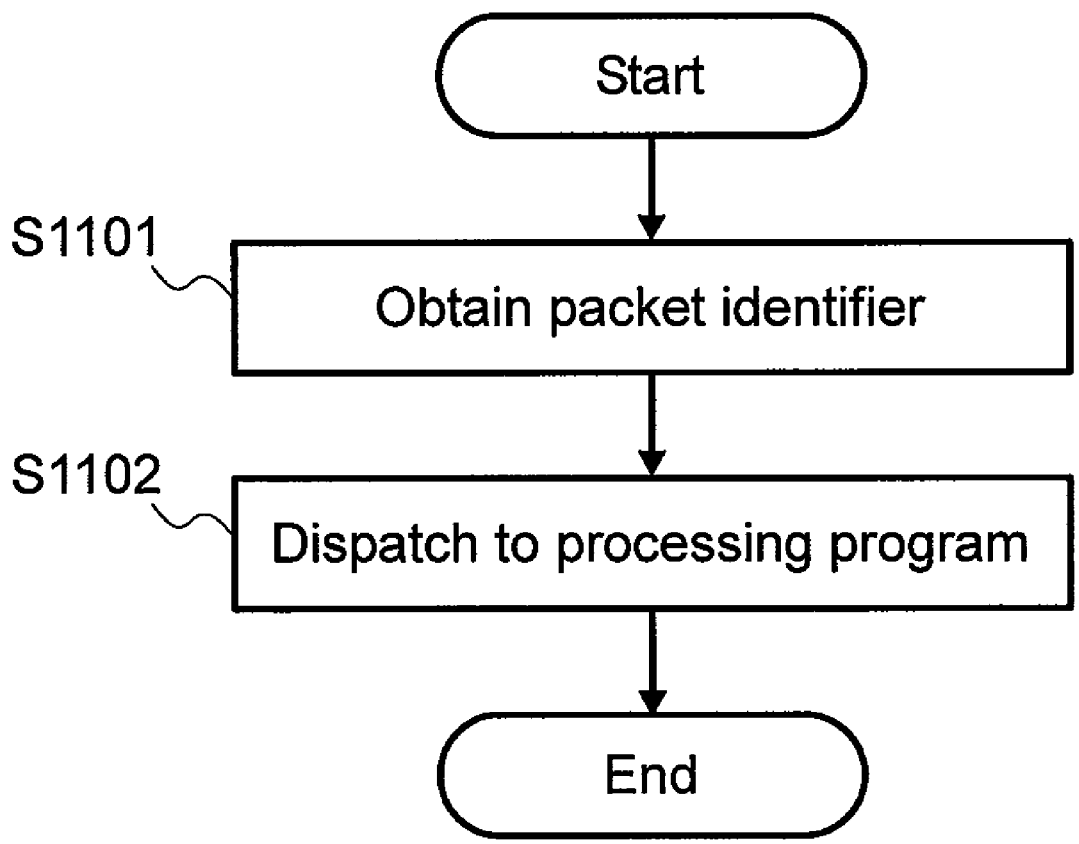

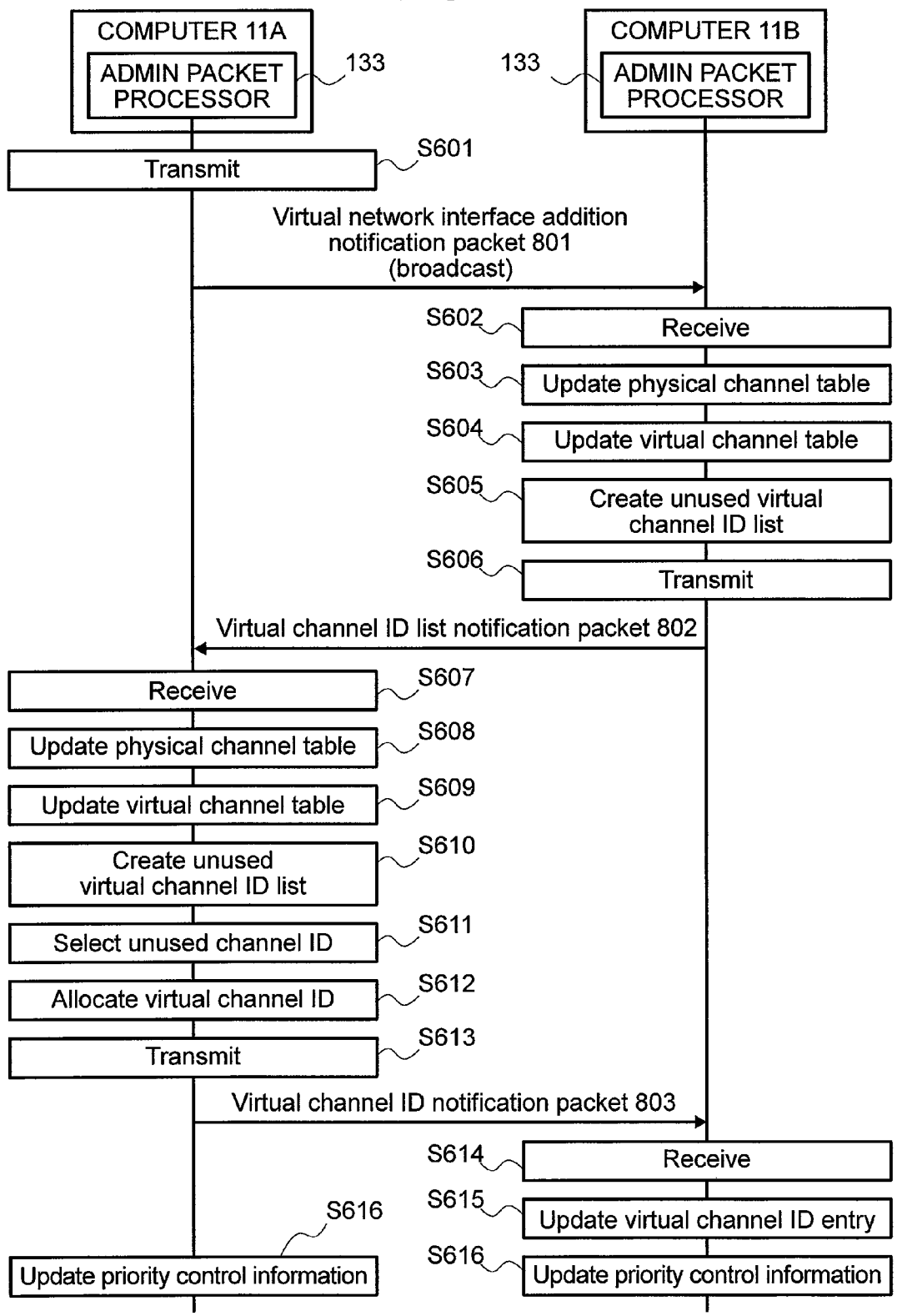

| Source physical network address | Destination physical network address | Packet identifier | Source virtual network address |
|---|---|---|---|
| PMAC A | Broadcast address | Label for "addition notification" | VMAC A |

Virtual network interface addition notification packet 801

(B)

| Source physical network address | Destination physical network address | Packet identifier | Destination virtual network address | Source virtual network address | Channel ID list |
|---|---|---|---|---|---|
| PMAC B | PMAC A | Label for "list notification" | VMAC A | MAC B | 1, 2, 3, 4 |

Virtual channel ID list notification packet 802

(C)

| Source physical network address | Destination physical network address | Packet identifier | Source virtual network address | Destination virtual network address | Channel ID |
|---|---|---|---|---|---|
| PMAC B | PMAC A | Label for "ID notification" | VMAC A | VMAC B | 5 |

Virtual channel ID notification packet 803

(D)

| Source physical network address | Destination physical network address | Packet identifier | Source virtual network address |
|---|---|---|---|
| PMAC A | Broadcast address | Label for "deletion notification" | VMAC A |

Virtual network interface deletion notification packet 804

(E)

| Source physical network address | Destination physical network address | Packet identifier | Channel ID |
|---|---|---|---|
| PMAC A | PMAC B | Label for "ID update" | 3 |

Virtual channel allocation notification 805

METHOD FOR CONFIGURING VIRTUAL NETWORK AND NETWORK SYSTEM

The present application claims priority from Japanese application serial no. JP 2007-137754, filed on May 24, 2007, the content of which is hereby incorporated by reference into this application.

BACKGROUND OF THE INVENTION

The present invention relates a method for configuring a virtual network, whereby a virtual network is configured between computers and managed, and a network system.

In computer systems, recently, high-speed network connection becomes an important challenge. In particular, data backup processing between servers requires large-bandwidth data transfer between servers.

As a bandwidth enhancement technique for computer networks, there is a heretofore known technique in which a plurality of network interface cards (hereinafter referred to as NICs) are aggregated into one interface that is virtually assumed as a single interface.

For example, a bonding technique is used in a Linux operating system. Bonding enables an increase in the bandwidth of a network (channel) by assigning communication tasks from a plurality of NICs with different network addresses to another NIC (see, e.g., Thomas Davis, et al. "Ethernet Bonding Driver".

A link aggregation technique, the 802.3ad standard developed by IEEE is also known. Link aggregation assigns one MAC address to a plurality of NICs which are handled as one virtual port (trunk). Access requests to the MAC address assigned to the trunk are distributed across a plurality of NICs belonging to the trunk and transferred to them (see, e.g., "802.3ad—2000 Local and Metropolitan Area Networks—Part 3" IEEE, 2000) (Non-Patent Document 2).

Also, a technique called PM library is disclosed. In the PM library, an application program delivers a packet to a virtual interface (channel). The packet delivered to the interface is labeled with the source computer's NIC address and the destination computer's NIC address described in a table of the virtual interface and transmitted. At this time, if both the source and destination computers have a plurality of NICs, from among these NICs, a pair of destination and source NICs is selected and the packet is transmitted. In a case that a plurality of packets are transmitted asynchronously, the packets are transmitted in parallel to physical interfaces and the bandwidths of a plurality of NICs can be used at the same time. Thereby, an increase in the bandwidth is achieved. Because explicit source and destination addresses are specified, data is transferred in parallel even in communication between two computers and the bandwidths of a plurality of NICs can be used (see, e.g., Tezuka Hiroshi, Hori Atsushi, Ishikawa Yu "Design and Implementation of Communication Library PM for Workstation Cluster", Joint Symposium on Parallel Processing JSPP '96, Information Processing Society of Japan, 1996, pp. 41-48) (Non-Patent Document 3).

SUMMARY OF THE INVENTION

In the technique described in Non-Patent Document 1 mentioned above, in data transfer between two computers, packets from a same network address are always received and handled by a same NIC. Thus, since one same NIC always receives packets between two computers, it is impossible to distribute data across a plurality of NICs for large-bandwidth communication between two computers.

In the technique described in Non-Patent Document 2 mentioned above, all NICs must be connected to a same network switch. This places limitations on network configurations. All NICs belonging to a trunk must be connected to a same network switch and all transit devices must support link aggregation.

The technique described in Non-Patent Document 3 explicitly maps a virtual channel to a physical device identified with a MAC address. Thereby, it is possible to distribute packets across a plurality of NICs and transmit and receive packets in parallel. Thus, an increase in the bandwidth can be achieved even in data transfer between two computers.

However, the PM library described in Non-Patent Document 3 is a program composed of specific libraries. A host application should be aware of necessary processing for a "channel" of the PM library to instruct the PM library to execute a network processing task. This means that running the PM library without modifying an existing application program would be a trouble.

In particular, a problem is a scheduling method for mapping a virtual channel to a physical NIC.

In the PM library described in No-Patent Document 3, an application program explicitly maps a virtual channel to a physical NIC. After this mapping is completed, source and destination addresses of a packet delivered to a virtual channel are translated into the addresses of physical interfaces. When a plurality of NICs are mapped, by selecting one of the NICs in turn, parallel data transmission over the NICs can be performed. Each application can perform scheduling according to characteristics of the application.

On the other hand, in Ethernet™ which is broadly used, there is no concept of mapping a virtual channel to a physical NIC. Therefore, scheduling by a control system that performs virtual network processing is required.

In view of the above-described problems, the present invention is intended to provide a network system in which a plurality of NICs are handled as a single virtual NIC by allocating a task for communication between virtual NICs to a virtual channel and physical interfaces without a need to modify an application program.

According to one aspect of the invention, a method for configuring a virtual network is provided, which is described below: in a network system including a first computer and a second computer, each having one or more physical network interfaces, and a network connecting the first computer and the second computer, wherein the first computer and the second computer can communicate with each other over the physical network interfaces, a method for configuring a virtual network between the first computer and the second computer, the method including: at the first computer, configuring a virtual network interface to be used for data transmission and reception by an application running on the first computer; setting up a virtual channel between the configured virtual network interface and a virtual network interface configured on the second computer and storing a correspondence between the set up virtual channel and the virtual network interfaces as virtual channel information; setting up a physical channel between a physical network interface on the first computer and a physical network interface on the second computer and storing a correspondence between the set up physical channel and the physical network interfaces as physical channel information; measuring traffic of data transmitted and received over the virtual channel and storing the traffic measurement results in the virtual channel information; when detecting a data transmission instruction to the virtual network interface, setting a correspondence between the virtual channel set up on the virtual network interfaces and one or more the physical channels, based on predetermined priority of the virtual channel and statistical information as the traffic measurement results stored, and storing the correspondence between the virtual channel and the one or more physical channels in the physical channel information; and transmitting the correspondence between the virtual channel and the one or more physical channels to the second computer having the virtual network interface to which the data transmission instruction is addressed; at the second computer, when receiving the correspondence between the virtual channel and the one or more physical channels, storing the received correspondence between the virtual channel and the one or more physical channels in the physical channel information, wherein the first computer transmits data in accordance with the data transmission instruction, using one or more the physical channels associated with the virtual channel, based on the correspondence stored.

As priority indicators, priority control information is used, such as a predetermined number of parallel connections and weighting value per virtual network (channel). As statistical information, virtual channel usage, or use frequency is used.

BRIEF DESCRIPTION OF THE DRAWINGS

FIG. 2 is a block diagram showing a configuration of a computer in an embodiment of the invention.

FIG. 3 illustrates an exemplary virtual channel table in an embodiment of the invention.

FIG. 4 illustrates an exemplary physical channel table in an embodiment of the invention.

FIG. 5 is a flowchart of data transfer processing according to an embodiment of the invention.

FIG. 6 is a flowchart of administrative packet processing according to an embodiment of the invention.

FIG. 7 is a sequence diagram of virtual NIC addition processing according to an embodiment of the invention.

FIGS. 9A through 9E illustrate exemplary formats of administrative packets in an embodiment of the invention.

DESCRIPTION OF THE PREFERRED EMBODIMENTS

Embodiments of the present invention will now be described with reference to the drawings.

Figure 1:
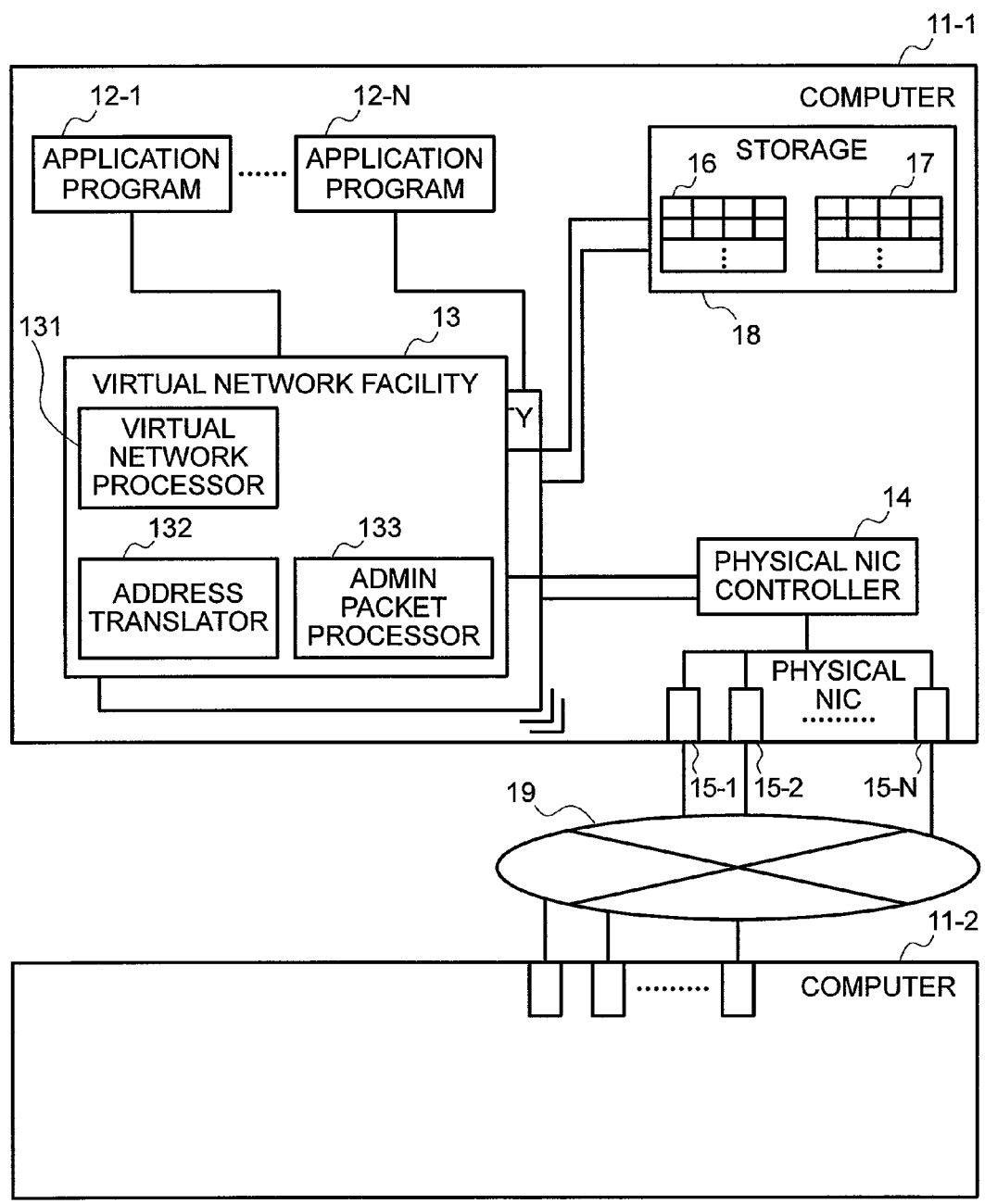
FIG. 1 is a block diagram showing a framework of a virtual network system according to an embodiment of the invention.

FIG. 1 is a block diagram showing a framework of a virtual network system according to an embodiment of the invention.

The virtual network system shown in FIG. 1 is comprised of one or more computers 11 (11-1, 11-2) and a network 19 connecting the computers. The computers 11-1, 11-2 are connected via the network 19.

Each computer 11 has N pieces of physical network interface cards (physical NICs) 15 (15-1, 15-2, 15-N).

A computer 11 includes one or more application programs 12 (12-1, 12-2, . . . , 12-N), one or more virtual network facilities 13, a physical NIC controller 14, and a storage 18. In the storage 18, a virtual channel table 16 and a physical channel table 17 are stored.

A virtual network facility 13 includes a virtual NIC processor 131, an address translator 132, and an administrative packet processor 133. The virtual network facility 13 refers to and may update the virtual channel table 16 and the physical channel table 17.

The virtual network facility 13 controls network processing on the computer 11.

The virtual network facility 13 may be implemented, for example, as a program that is run by a CPU 201 (see FIG. 2). Alternatively, the virtual network facility 13 may operate as a part of a basic program such as an operating system (OS), a virtual machine monitor (VMM) for virtualization of the computer, or a hypervisor. Alternatively, the virtual NIC processor 131, address translator 132, and administrative packet processor 133 may be implemented as a part of a program for operation of the virtual network facility 13.

With program execution by the CPU 201, the virtual network facility 13 provides a virtual network interface to an application program 12 running on the computer 11.

In the present embodiment, the virtual network facility 13 provides network interfaces equivalent to the physical NICs 15 to the application program 12. A virtual network interface provided by the virtual network facility 13 is referred to as a "virtual NIC". A virtual NIC is assigned a network address which is a unique identifier within a virtual network. An administrator of the computer 11 can define a plurality of virtual network facilities 13 on a single computer.

As an identifier to identify a virtual NIC's network address, addressing for the second layer of the OSI model is generally used. In the present embodiment, a MAC address is used as a virtual NIC's network address.

An application program 12 on one computer communicates with other computer 11 over a virtual channel set up in the virtual network by a pair of a virtual NIC on its own computer 11 and a virtual NIC on the other computer 11.

The virtual channel table 16 stores a correspondence between virtual NICs and a virtual channel. The physical channel table 17 stores a correspondence between a physical channel set up between physical NICs 15 in the network 19 and a virtual channel.

The virtual NIC processor 131 interprets a data transfer instruction which has been delivered via a virtual NIC to it from an application program 12 running on the computer 11 and controls virtual NICs and physical NICs as actual hardware.

More specifically, when a data transfer instruction to a virtual NIC has been issued from the application program 12, the virtual NIC processor 131 refers to the virtual channel table 16 and identifies a virtual channel associated with the virtual NIC. Then, it refers to the physical channel table 17 and identifies a physical channel associated with the identified virtual channel.

The virtual NIC processor 131 determines whether a received packet is an administrative or data packet. For an administrative packet identifier, an identifier indicating an administrative packet and what is contained in it is added.

To indicate an administrative packet, VLAN (Virtual LAN) ID may be used. The virtual NIC processor 131 transmits a data packet as an administrative packet to which it adds a VLAN tag including a particular VLAN ID. When receiving a data packet to which a particular VLAN ID is added, the virtual NIC processor handles it as an administrative packet.

Instead of the VLAN tag, one bit that is not used in a packet header may be set to be an identifier indicating an administrative packet.

The address translator 132 executes translation from a virtual NIC network address in a received packet to the corresponding physical NIC 15 network address and vice versa by referring to the virtual channel table 16 and the physical channel table 17.

If an administrative packet is received, the administrative packet processor 133 updates the virtual channel table 16 and the physical channel table 17 according to the contents of the administrative packet and transmits the administrative packet to any other computer 11, if necessary.

When the computers 11 provided with virtual network facilities transmit packets to each other, how to use a plurality of physical NICs 15 of the computers 11 can be determined through the processes that are executed as described above by the constituent elements of each computer 11 in the virtual network system.

For example, by allocating one virtual channel to a plurality of physical channels, it is possible to distribute a network processing task to a plurality of physical NICs 15 and parallelize packet transmission and reception. In this way, by distributed packet transmission and reception, it is feasible to carry out communication with a higher bandwidth between the computers 11.

FIG. 2 is a block diagram showing a configuration of a computer 11 in an embodiment of the invention.

A computer 11 includes one or more CPUs 210 (210-1 ... 210-N), a north bridge 203, a memory 204, an IO bridge 205, and an IO bus 206.

Each CPU 210 and the north bridge 203 are connected via a front side bus 202. The north bridge 203 is connected to the front side bus 202, memory 204, and IO bridge 205. The IO bridge 205 is connected to the IO bus 206. Two or more IO buses 206 may be provided.

The north bridge 203 controls data transfer between each CPU 210 and the memory 204 and data transfer between the memory 204 and the IO bridge 205.

The memory 204 constitutes the above-mentioned storage 18. The memory 204 stores programs which are executed by the CPUs 210, various kinds of data, and cache memories, and the like. Moreover, the memory 204 is used as a memory space by the components of the computer 11 and a particular memory space is used as a target address space for allowing a particular component to execute a particular control instruction.

IO bridges 205 controls data transfer between an IO device connected to the IO bus 206 and the north bridge 203. The IO bus 206 is composed of, for example, a PCI bus IO devices exemplified in FIG. 2 are a disk interface (IF) 207 including, e.g., SCSI or FC, NICs 208, and I/O equipment 209. The disk IF 207 is connected to an external storage 210 including, e.g., a hard disk. The NICs 208 as the physical NICs 15 provide connections to the network 19. The I/O equipment 209 provides connections for external I/O equipment such as a keyboard and a display.

CPU 210 reads and executes a program located in the memory 204 via the north bridge 203. According to a program description, CPU 210 controls data transfer by issuing a data transfer instruction to the disk IF 207 or NICs 208 via the north bridge 203 and IO bridge 205, as required.

The memory 204 and IO devices (disk IF 207, NICs 208, and I/O equipment 209) have unique address spaces, respectively, on the computer 11. CPU 210 issues a data transfer instruction, specifying an address for data transfer. The memory 204 and IO devices execute data transfer according to the address.

Each computer in the virtual network system has two or more (N pieces of) physical NICs 15, as described above, and these NICs 15 provide connections to the network 19. The physical NICs 15 are not always connected directly to the network 19 and one or more switches may exist on a communication path between the computers 11 over their physical NICs 15. However, it is assumed that a segment between the computers 11 is not separated by a router existing in the network.

The virtual network facility 13 and virtual NIC processor 131 may be implemented, by way of example, as follows.

If the virtual network facility 13 is run as a part of OS, the virtual NIC processor 131 may be implemented as a device driver of the OS. The virtual NIC processor 131 receives a transmission instruction via a virtual NIC by using an interface defined by the OS and converts the received instruction into a device-specific control instruction, thereby transferring data corresponding to the transmission instruction.

If the virtual network facility 13 is run as a part of a hypervisor, the virtual NIC processor 131 may be implemented as a program for virtual NIC processing of the hypervisor. The virtual NIC processor 131 emulates a software interface for the physical NICs 15. The virtual NIC processor 131 receives an NIC control instruction issued from a virtual computer on the hypervisor, interprets the received instruction, and executes an operation to comply with the instruction.

In the case of running the virtual network facility 13 as a part of a hypervisor, an application program 12 corresponds to an OS (guest OS) running on the virtual computer. In general, when a hypervisor receives an instruction from the OS on the virtual computer through an interface such as an IO port or MMIO (Memory Mapped IO) of the virtual computer, it interprets the instruction and converts it into a control instruction for the physical NICs 15, thereby executing data transfer. In the present embodiment, such IO port or MMIO is emulated by the virtual NIC processor 131. Emulating the IO port or MMIO is implemented using a method that is commonly implemented in a hardware emulator and its detailed description is not given herein, because it is out of the scope of the present invention.

FIG. 3 illustrates an exemplary virtual channel table 16 in an embodiment of the invention.

The virtual channel table 16 provided in a computer holds a set of data in which the network address of a virtual network facility 13 on its own computer is mapped to the network address of a virtual network facility 13 on any other computer 11 existing in the virtual network 13 and this table is maintained for virtual channel management.

The computer 11 maintains the virtual channel table 16 as, for example, a table in a relational database format.

The virtual channel table 16 includes one or more records, each including a set of attributes: its own computer's virtual network address 301, other computer's virtual network address 302, virtual channel ID 303, virtual channel priority control information 304, and virtual channel use frequency 305.

Its own computer's virtual network address 301 is the network address of a virtual network facility 13 on its own computer.

The other computer's virtual network address 302 is the network address of a virtual network facility 13 on any other computer 11 existing in the virtual network system.

A virtual network path identified by a pair of these its own computer's virtual network address 301 and other computer's virtual network address 302 is a "virtual channel". That is, a record in the virtual channel table 16 stores information on this virtual channel.

The virtual channel ID 303 is an identifier to uniquely identify a virtual channel which is logically assigned to transport packets transmitted and received between two computers in the network. A virtual channel ID must be unique between two computers. For example, an integer value is used as a virtual channel ID.

If a MAC address is used as the network address of a virtual network facility 13 on a computer as previously described, each record of the table is used by the virtual network facility 13 to identify a virtual channel indicated by the virtual channel ID 303 to transport packets for data transfer from its own computer's virtual network address 301 (MAC address) to the other computer's virtual network address 302 (MAC address) and vice versa.

The virtual channel priority control information 304 is information indicative of performance to be assigned to the virtual channel. There are some performance indicators such as, for example, channel bandwidth and priority indicators. In the present embodiment, the number of physical channels parallelized is used as the channel bandwidth indicator and a channel weighting value is used as the priority indicator.

The virtual channel use frequency 305 is information indicating the frequency of packet transmission and reception performed on the virtual channel for a certain period.

The virtual NIC processor 131 has an area allocated for a counter and an area for storing an average value in the memory 204. Each time a process of packet transmission and reception over a virtual channel is completed, the virtual NIC processor 131 increments the value stored in the counter area by one. The counter is cleared at every end of a certain period. The value immediately before clearing the counter is copied to the area for storing an average value. At every end of a certain period, the virtual channel use frequency 305 in the virtual channel table 16 is updated with this average value. In this way, for each virtual channel, the frequency of communication over the virtual channel for a certain period is stored. The certain period is set to, for example, one second.

When data transfer is enabled over a virtual channel between two virtual network addresses, indicated by a virtual channel ID, the virtual channel is regarded as "available for communication".

FIG. 4 illustrates an exemplary physical channel table 17 in an embodiment of the invention.

The physical channel table 17 holds a set of data specifying a rule for translation of a destination network address and a source network address of a packet associated with a virtual channel ID.

The computer 11 maintains the physical channel table 17 as, for example, a table in a relational database format.

The physical channel table 17 includes one or more records, each including a set of attributes: its own computer's physical network address 401, other computer's physical network address 402, virtual channel IDs allocable 403, and virtual channel ID allocated 404.

Its own computer's physical network address 401 is the MAC address of a physical NIC 15 of its own computer.

The other computer's physical network address 402 is the MAC address of a physical NIC 15 of any other computer 11 in the virtual network system.

A physical network path identified by a pair of these its own computer's physical network address and other computer's physical network address is a "physical channel". That is, a record in the physical channel table 17 stores information about this physical channel.

The virtual channel IDs allocable 403 are virtual channel IDs to which the physical channel that is specified by two physical MAC addresses is allocable.

The virtual channel ID allocated 404 is the ID of a virtual channel actually allocated to the physical channel at the present.

When data transfer is enabled over a physical channel between two physical NICs 15 of two respective computers and a virtual channel is available for communication by operation of the virtual NIC processors 131 and address translators 132 of the respective computers having the physical NICs, the physical channel is regarded as the one to which the virtual channel is allocable.

When the virtual NIC processor 131 processes a communication task on a virtual channel between virtual network interfaces, and when this process is set to translate the virtual network addresses into physical network addresses of a physical channel by the address translator 132 and transfer data on the physical channel between two physical NICs 15 instead of transferring data on the virtual channel, the virtual channel is regarded as the one "already allocated" to the physical channel.

When a virtual channel ID is registered in the field of virtual channel ID allocated 404, this indicates that the virtual channel has already been allocated to the physical channel of the record.

One virtual channel can be allocated to one or more physical channels. In a case that one virtual channel has been allocated to one or more physical channels, packets to be communicated on this virtual channel are distributed across a plurality of physical channels by the virtual NIC processor 131 and transmitted over the physical channels. Thereby, data communication over even a single virtual channel is allowed to use the respective bandwidths of the physical NICs 15 and large-bandwidth communication can be realized.

Then, a process that is performed by the virtual network facility 13 is described.

FIG. 5 is a flowchart of data transfer processing between two network interfaces in a virtual channel, which is performed by the virtual NIC processor 131, address translator 132, and administrative packet processor 133 in the virtual network facility 13 according to an embodiment of the invention.

Processing on a transmitting-side computer 11 is first described.

On the transmitting-side computer 11, when an application program 12 using virtual network interfaces issues a data transfer instruction to a virtual NIC, the virtual NIC processor 131 detects the data transfer instruction issued (step S501).

As a data transfer instruction is issued by an application program 12, for example, data to be transferred is stored in a predetermined area on the memory 204 by the application program 12 and the virtual NIC processor 131 detects the instruction issued to the virtual NIC by accessing the predetermined area in the memory space in the computer 11. In this way, a data transfer instruction is issued by a method prearranged by virtual network interfaces.

A data transfer instruction is composed of a set of a transmission instruction identifier and transmission packet data. The transmission packet data includes a source virtual network address, a destination virtual network address, and transmission data.

Then, the virtual NIC processor 131 on the computer 11 refers to the virtual channel table 16 and searches for a virtual channel for packet transmission which is caused by the data transfer instruction (step S502).

Specifically, the virtual NIC controller 131 refers to the virtual channel table 16 and searches for a record in which a pair of its own computer's virtual network address 301 and other computer's virtual network address 302 matches with a pair of the virtual network address assigned to the virtual NIC to which the data transfer instruction has been issued, as detected in the step S501, and the destination virtual network address of transmission packet data specified in the data transfer instruction. In the thus found record, the virtual channel is retrieved by selecting the virtual channel from the field of virtual channel ID 303.

Then, if the virtual channel fulfilling the condition for a match is retrieved in the step S502, the virtual NIC controller 131 executes steps S504 to S517; if not so, step S523 is executed (step S503).

At step S523, an unsuccessful termination of the data transfer processing occurs, because the object virtual channel is not set. The virtual NIC controller 131 performs failure handling prearranged for network interfaces and terminates the processing of this flowchart.

At step S504, the virtual NIC processor 131 refers to the physical channel table 17 and searches for physical channels allocated to the virtual channel retrieved in the step S502.

If physical channels allocated to the virtual channel are found in the step S504, the virtual NIC processor 131 and address translator 132 execute steps S506 to S517; if not so, step S525 is executed (step S505).

At step S525, a physical channel allocation process is executed to allocate the virtual channel for data transfer requested to a physical channel newly. This process will be described later in conjunction with FIGS. 10 and 11. As the result of this process, steps S506 to S517 are executed using the newly allocated physical channel.

At step S506, the virtual NIC processor 131 selects one of the physical channels retrieved in the step S505.

A suitable physical channel may be selected, for example, in the following manners: (1) round-robin, (2) round-robin weighted by the number of packets transmitted, and (3) selecting a channel with the lowest number of packets transmitted. According to each manner adopted, optionally, fields for knowledge about the relative states of the physical channels such as information to identify a physical channel allocated at the last allocation may be added to the records in the physical channel table 17 as appropriate columns.

Depending on the hardware characteristics of physical NICs 15, a high data transfer rate may be achieved by continuous transmission of a certain batch of packets. If the physical NICs 15 having such characteristics are used, as a variation of the above round-robin manner (1), such a method may be used that a physical channel for data transfer is determined when the number of packets transmitted has reached a fixed number or at fixed intervals and the same physical channel is used until the next determination timing.

Then, the address translator 132 translates the destination virtual network address and the source virtual network address included in the packet for data transfer requested into the other computer's network address 402 and its own computer's network address 401 of the physical channel selected in the step S506 (step S507). Thereby, the source virtual network address of the packet is changed to the network address of the physical NIC 15 on its own computer 11 and the destination virtual network address is changed to the network address of the physical NIC 15 on the destination computer 11.

Next, the virtual NIC processor 131 issues a packet in which the virtual addresses have been translated into network addresses to the physical NIC 15 having the source physical network address of the physical channel. Consequently, by the physical NIC controller 14, the packet is transmitted over the physical NIC 15 onto the network 19 (step S508).

After executing the steps S501 to S508, here, the virtual NIC processor 131 retrieves the record including the virtual channel selected in the step S502 from the virtual channel table 16 and updates the counter value of virtual channel use frequency in the record by incrementing it by one (step S517).

A control method for physical NICs 15 is the same as for a commonly used device driver and its detailed description is not given herein.

As will be described later in conjunction with FIG. 11, a virtual channel ID may be added as a VLAN ID in a VLAN tag attached to a packet for data transfer requested. In a general manner, attaching a VLAN tag is performed by a hardware device circuit specific for processing included in a physical NIC 15 and can be carried out quickly. By attaching a VLAN tag in this way, the virtual NIC processor 131 can identify the virtual channel for transmission of the packet by referring to the VLAN ID.

Through the above-described processing, a packet transmitted using a virtual channel is transmitted through a physical channel to the receiving-side computer 11.

Next, processing on the receiving-side computer 11 is described.

On the receiving-side computer 11, the virtual NIC processor 131 detects that a physical NIC 15 has received a packet. Th virtual NIC controller 131 detects the packet reception by detecting an interrupt issued from the physical NIC 15 to the CPU 202 (step S509).

A packet received includes a source physical network address, a destination physical network address, and a data sequence received.

The virtual NIC processor 131 on the receiving-side computer 11 determines whether the packet received in the step S509 is an administrative packet or a data packet (step S510).

For example, if a packet having a particular VLAN ID is set to be identified as an administrative packet, as previously described, the virtual NIC processor checks the VLAN tag of the received packet and determines that an administrative packet has been received, if the VLAN ID indicating an administrative packet is added to the packet.

As will be described later in conjunction with FIG. 11, if an arrangement is made to add a virtual channel ID in a VLAN ID tag attached to a packet for data transfer requested, and when the VLAN ID tag of the packet is found not to indicate an administrative packet, the virtual NIC processor 131 generates a virtual channel allocation notification packet.

If the VLAN ID is found to indicate an administrative packet in the step S510, the virtual NIC processor 131 transfers the received packet to the administrative packet processor 133 and administrative packet processing illustrated in FIG. 6 is performed (step S530).

Transferring the packet from the virtual NIC processor 131 to the administrative packet processor 133 is performed such that, after writing packet data or a memory address (pointer) of packet data into a memory area managed by the administrative packet processor 133, the virtual NIC processor 131 calls the administrative packet processor 133.

If the received packet is a data packet not an administrative packet, as determined at step S510, the following steps S511 to S517 are executed.

First, the virtual NIC processor 131 refers to the physical channel table 17, searches for a record including the source physical network address and the destination physical network address of the received packet, and selects a physical channel (step S511).

If a physical channel has been selected in the step S511, steps S513 to S517 are executed. If no physical channel has been selected, then the virtual NIC processor determines that the received packet is an administrative packet and transfers it to the administrative packet processor 133, and the administrative packet processing (step S530) illustrated in FIG. 6 is executed (step S512).

At step S513, the virtual NIC processor 131 on the receiving-side computer 11 refers to the virtual channel table 16, searches for a record including a virtual channel ID matching the virtual channel ID allocated, associated with the physical channel, and retrieves the virtual channel ID (step S513).

If the record of a virtual channel associated with the physical channel is found in the step S513, the virtual NIC processor 131 on the receiving-side computer 11 executes steps S515 to S517. If no virtual channel associated with the physical channel is found, the virtual NIC processor 131 determines that the received packet is an administrative packet and transfers the received packet to the administrative packet processor 133, and the administrative packet processing (step S530) illustrated in FIG. 6 is executed (step S514).

At step S515, the address translator 132 at the receiving side translates the source physical network address and destination physical network address of the received packet into other computer's virtual network address and its own computer's virtual network address in the virtual channel table 16 for the virtual channel ID retrieved in the step S513. Thereby, the source physical network address of the received packet is changed to the other computer's virtual network address of the virtual channel and the destination physical network address is changed to its own computer's virtual network address.

Then, the address translator 132 on the receiving-side computer 11 notifies the virtual NIC having its own computer's virtual network address of the virtual channel that a packet has been received (step S516).

Specifically, the address translator 132 copies the received packet into a receiving buffer area of the virtual NIC and notifies the NIC of packet reception by issuing an interrupt to the CPU.

After executing the steps S509 to S516, the virtual NIC processor 131 on the receiving-side computer 11 then retrieves the record including the virtual channel retrieved in the step S513 from the virtual channel table 16 and updates the counter value of virtual channel use frequency in the record by incrementing it by one (step S517).

Through the above-described processing, a packet received through the use of a physical channel is passed over a virtual channel to an application program 12 using the virtual NIC for the virtual channel.

FIG. 6 is a flowchart of administrative packet processing (step S530 in FIG. 5) in the administrative packet processor 133 on the receiving-side computer 11 according to an embodiment of the invention.

First, the administrative packet processor 133 obtains the packet identifier of the received packet (step S1101).

The administrative packet processor 133 holds a table (packet identifier table) in which a correspondence between a packet identifier and a program address is defined, prestored in the memory 204. This definition table is embodied in the program for running the administrative packet processor.

The administrative packet processor searches the packet identifier table for a program associated with the packet identifier obtained in the step S1101 and passes the address in the memory space for running the retrieved program to the process. In consequence, the corresponding program for each packet identified by the packet identifier is executed (step S1102).

In the present embodiment, as an example of the packet identifier table, programs for carrying out respective operations which will be described below are defined corresponding to packet identifiers.

For an administrative packet identifier that indicates a virtual network interface addition notification packet, the address of a program for updating the physical channel table in step S603 in FIG. 7 is defined in the packet identifier table.

For an administrative packet identifier that indicates a virtual channel ID list notification packet, the address of a program for updating the physical channel table in step S608 in FIG. 7 is defined in the packet identifier table.

For an administrative packet identifier that indicates a virtual channel ID notification packet, the address of a program for updating a virtual channel ID entry in step S615 in FIG. 7 is defined in the packet identifier table.

Figure 8:
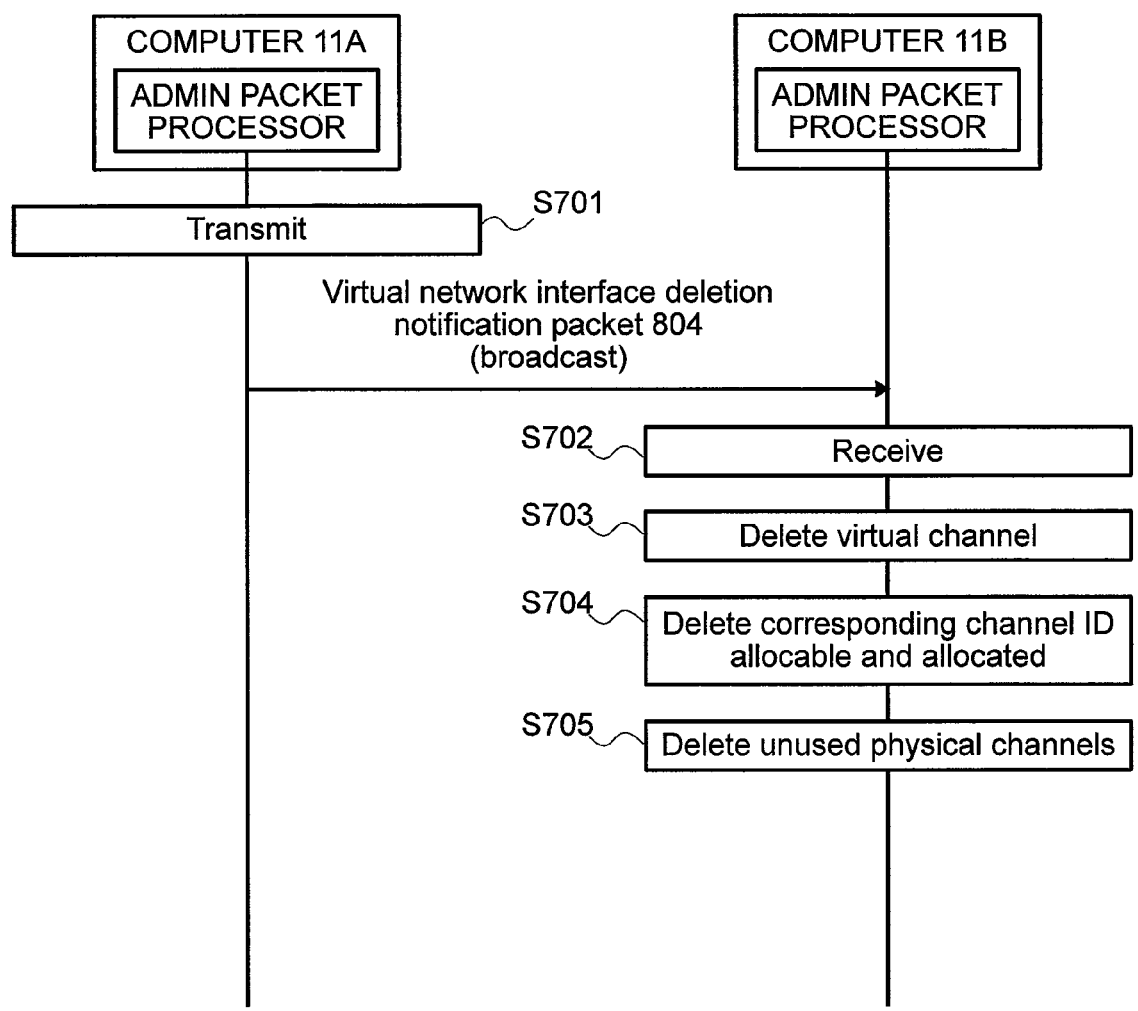
FIG. 8 is a sequence diagram of virtual NIC deletion processing according to an embodiment of the invention.

For an administrative packet identifier that indicates a virtual network interface deletion notification packet, the address of a program for deleting a virtual channel in step S703 in FIG. 8 is defined in the packet identifier table.

Figure 11:
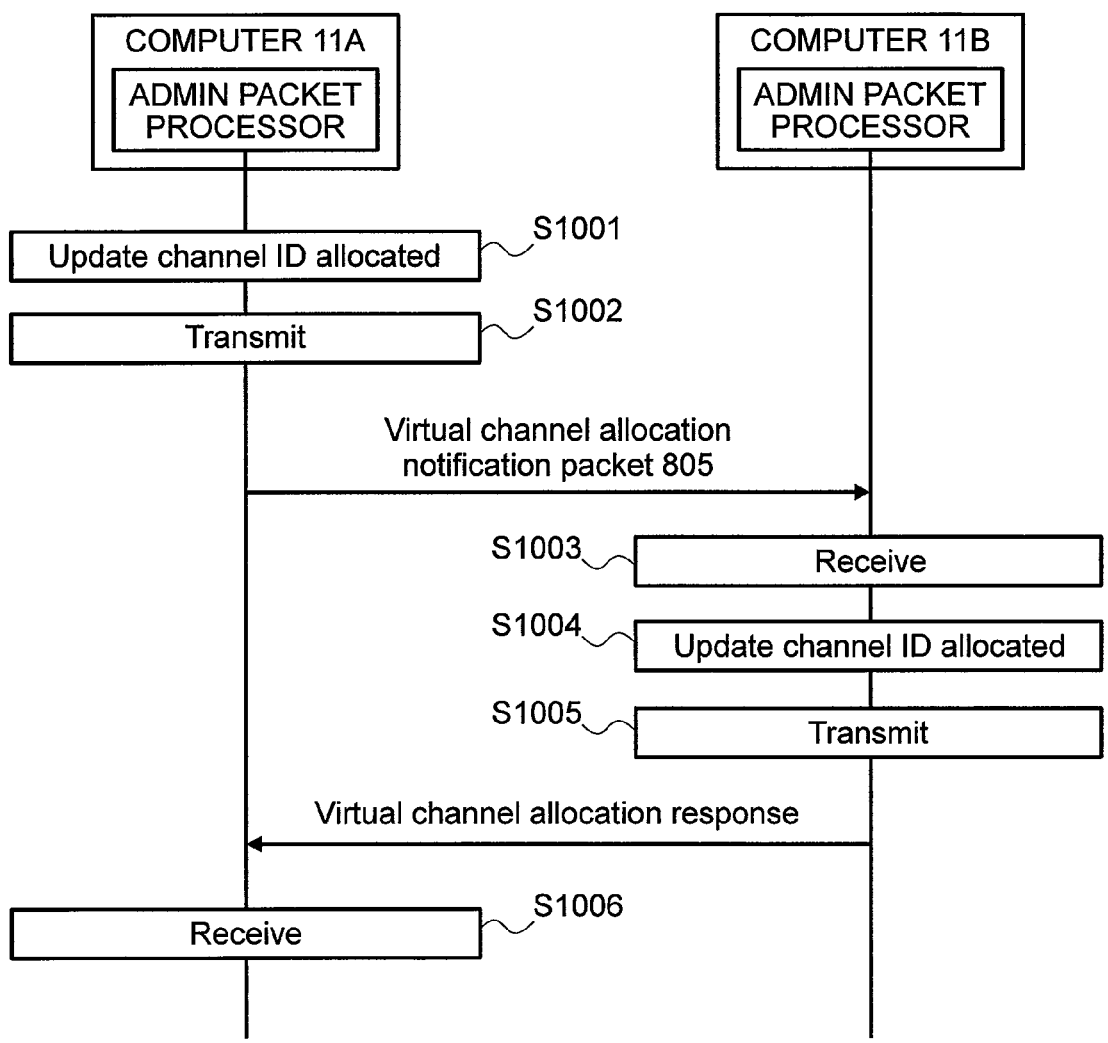
FIG. 11 is a sequence diagram of allocated channel ID update processing according to an embodiment of the invention.

For an administrative packet identifier that indicates a virtual channel allocation notification packet, the address of a program for updating a channel ID allocated in step S1004 in FIG. 11 is defined in the packet identifier table.

For an administrative packet identifier that indicates a virtual channel ID allocation response packet, the address of a program for receiving a virtual channel ID allocation response in step S1006 in FIG. 11 is defined in the packet identifier table.

Next, a process in which each computer 11 in the virtual network updates physical channel and virtual channel configurations is described. In this process, each computer 11 updates the virtual channel table 16 and the physical channel table 17. Updating the table means adding and deleting a record to/from each table.

FIG. 7 is a sequence diagram of virtual NIC addition processing according to an embodiment of the invention.

In the sequence diagram of FIG. 7, in the virtual network including two computers 11A and 11B, updating virtual NIC, physical channel, and virtual channel configurations is performed between the computers 11A and 11B.

First, the computer 11A adds a new virtual NIC (virtual NIC A). Adding a virtual NIC is requested by an administrator, using a keyboard and a display 209 or the like attached to the computer 11A. Alternatively, a virtual NIC may be added by a request or the like from a host operating system or managing program.

When a virtual NIC has been added on the computer 11A, the administrative packet processor 133 transmits a virtual network interface addition notification packet by broadcasting from each physical NIC 15 of the computer 11A onto the network 19 (step S601). An identifier (for example, VLAN ID) indicating an administrative packet is attached to this virtual network interface addition notification packet.

The virtual network interface addition notification packet 801 (see FIG. 9A) includes source physical network address, destination physical network address, packet identifier, and source virtual network address. The packet identifier field contains an identifier indicating "addition notification". By this identifier, the virtual NIC processor 131 at the receiving side can identify this packet as the virtual network interface addition notification packet.

On the computer 11B, the virtual NIC processor 131 receives the virtual network interface addition notification packet transmitted by broadcasting (step S602). This received packet is found to be an administrative packet and the administrative packet processor 133 executes subsequent processing.

The administrative packet processor 133 on the computer 11B refers to the physical channel table 17 stored in the storage 18 of its own computer 11B and selects a physical channel record in which other computer's physical network address and its own computer's physical network address match with the source physical network address included in the virtual network interface addition notification packet and the physical network address of the physical NIC 15 that received the packet, respectively.

Here, if a matching physical channel is not found in the physical channel table 17, the administrative packet processor 133 on the computer 11B updates the physical channel table 17 (step S603); that is, it registers a new physical channel record into the physical channel table 17 by storing the source physical network address of the virtual network interface addition notification packet and the physical network address of the physical NIC 15 that received the packet in the fields of other computer's physical network address 402 and its own computer's physical network address 401 of the physical channel table 17, respectively.

Then, the administrative packet processor 133 refers to the virtual channel table 16 stored in the storage 18 of its won computer 11B. With regard to a virtual NIC (virtual NIC B) set on its own computer 11B, it selects a virtual channel record in which a pair of other computer's virtual network address and its own computer's virtual network address matches with a pair of the source virtual network address included in the virtual network interface addition notification packet and the virtual network address of the virtual NIC B.

Here, if a matching virtual channel record is not found in the virtual channel table 16, the administrative packet processor 133 on the computer 11B updates the virtual channel table 16 (step S604); that is, it registers a new virtual channel record into the virtual channel table 16 by storing the source virtual network address included in the virtual network interface addition notification packet and the virtual network address of the virtual NIC B in the fields of other computer's virtual network address 302 and its own computer's virtual network address 301 of the virtual channel table, respectively.

A virtual channel ID of the newly registered virtual channel is not determined in this processing and it should be determined in subsequent processing.

Then, the administrative packet processor 133 on the computer 11B searches the virtual channel table 16 on its own computer 11B, retrieves all virtual channel IDs used in its own computer 11B, and creates a list of the virtual channel IDs retrieved (step S605).

Then, the administrative packet processor 133 on the computer 11B creates a virtual channel ID list notification packet for the virtual channels selected and created in the step S604, addressed to the source physical network address included in the virtual network interface addition notification packet. The created virtual channel ID list notification packet is transmitted as an administrative packet 802 (step S606).

The virtual channel ID list notification packet 802 (see FIG. 9B) includes source physical network address, destination physical network address, packet identifier, destination virtual network address, source virtual network address, and a virtual channel ID list created in the step S605.

In the virtual channel ID list notification packet, the packet identifier field contains an identifier indicating "list notification". By this identifier, the virtual NIC processor 131 at the receiving side can identify this packet as the virtual channel ID list notification packet.

On the computer 11A, the virtual NIC processor 131 receives the virtual channel ID list notification packet transmitted by broadcasting (step S607). This received packet is found to be an administrative packet and the administrative packet processor 133 executes subsequent processing.

The administrative packet processor 133 on the computer 11A executes the same processing as the steps S603 to S605 performed on the computer 11B and updates the physical channel table 17 and the virtual channel table 16 on the computer 11A.

In particular, the administrative packet processor 133 on the computer 11A refers to the physical channel table 17 and selects a physical channel record in which other computer's physical network address and its own computer's physical network address match with the source physical network address included in the virtual channel ID list notification packet and the physical network address of the physical NIC 15 that received the packet, respectively.

If a matching physical channel is not found in the physical channel table 17, the administrative packet processor 133 on the computer 11A updates the physical channel table 17 (step S608); that is, it registers a new physical channel record into the physical channel table 17 by storing the source physical network address of the virtual channel ID list notification packet and the physical network address of the physical NIC 15 that received the packet in the fields of other computer's physical network address 402 and its own computer's physical network address 401 of the physical channel table 17, respectively.

Then, the administrative packet processor 133 refers to the virtual channel table 16. With regard to a virtual NIC (virtual NIC A') set on its own computer 11A, it selects a virtual channel record in which a pair of other computer's virtual network address and its own computer's virtual network address matches with a pair of the source virtual network address included in the virtual channel ID list notification packet and the virtual network address of the virtual NIC A'.

If a matching virtual channel record is not found in the virtual channel table 16, the administrative packet processor 133 on the computer 11A updates the virtual channel table 16 (step S609); that is, it registers a new virtual channel record into the virtual channel table 16 by storing the source virtual network address included in the virtual channel ID list notification packet and the virtual network address of the virtual NIC A' in the fields of other computer's virtual network address 302 and its own computer's virtual network address 301 of the virtual channel table, respectively.

Then, the administrative packet processor 133 on the computer 11A searches the virtual channel table 16 on its own computer 11A, retrieves all virtual channel IDs used in its own computer 11A, and creates a list of the virtual channel IDs retrieved (step S610).

Then, the administrative packet processor 133 on the computer 11A refers to the virtual channel ID list (list A) created in the step S610 and the virtual channel ID list (list B) included in the virtual channel ID list notification packet received in the step S607 and selects one virtual channel ID not included in both lists (step S611).

Because virtual channel IDs are stored as integer values, a lowest integer value not included in both list A and list B is selected.

Then, the administrative packet processor 133 on the computer 11A registers the virtual channel ID determined in the step S611 into the field of virtual channel IDs allocable 403 for the physical channel record registered in the above step S608 in the physical channel table 17 (step S612). Thereby, a new virtual channel is allocable to the physical channel.

Then, the administrative packet processor 133 on the computer 11A creates a virtual channel ID notification packet addressed to the source physical network address of the virtual channel ID list notification packet received in the step S607. The created virtual channel ID notification packet is transmitted as an administrative packet (step S613).

The virtual channel ID notification packet (see FIG. 9C) includes source physical network address, destination physical network address, packet identifier, source virtual network address, destination virtual network address, and virtual channel ID data created in the step S609.

In the virtual channel ID notification packet, the packet identifier field contains an identifier indicating "ID notification". By this identifier, the virtual NIC processor 131 at the receiving side can identify this packet as the virtual channel ID notification packet.

On the computer 11*b*, the virtual NIC processor 131 receives the virtual channel ID notification packet transmitted (step S614). This received packet is found to be an administrative packet and the administrative packet processor 133 executes subsequent processing.

The administrative packet processor 133 on the computer 11B stores the virtual channel ID included in the received virtual channel ID notification packet into the field of virtual channel ID 303 for the virtual channel record newly created in the step S604 in the virtual channel table 16, thus assigning the virtual channel ID.

Also, the administrative packet processor 133 adds the virtual channel ID included in the virtual channel ID notification packet received in the step S613 in the field of virtual channel IDs allocable 403 for the physical channel record newly created in the step S603 in the physical channel table 17, thus updating the physical channel table 17 (step S615).

Through the above-described processing, a virtual channel is set to be allocable.

Here, when the virtual channel fixed by the above virtual channel ID has been created, the virtual NC processors 131 at both the transmitting side and the receiving side notify the host operating system or managing program that the virtual channel has been created. The host operating system or managing program determines priority control information composed of the number of physical channels parallelized and a network weighting value for the created virtual channel.

The managing program fixes the number of physical channels parallelized and a network weighting value entered by the user or administrator of the computer as priority control information.

More specifically, the managing program displays its own computer's virtual network address and the other computer's network address of the virtual channel and prompts the administrator of the computer to specify the number of physical channels parallelized and a network weighting value for the virtual channel.

As an alternative, priority control information may be fixed using default values predefined by the system. This method may be arranged to allow the administrator of the computer to change the priority control information in the virtual channel table 17 at arbitrary timing by using an administrative command or the like including a virtual channel ID, the number of physical channels parallelized, and a network weighting value as parameters.

The administrative packet processor 133 stores the thus fixed number of physical channels parallelized and network weighting value into the relevant fields of virtual channel priority control information 304 in the virtual channel table 16 (step S616).

The steps S601 to S616 are transactionally managed; that is, if the sequence of steps S601 to S616 is not completed within a certain period, then the administrative packet processor 133 deletes the created physical channel record and virtual channel record.

In this way, in the steps S601 to S606 in FIG. 7, the computer 11B receives a virtual network interface addition notification packet broadcasted from the computer 11A in the virtual network system and registers a pair of physical NICs 15 connectable with each other as a physical channel. Also, from the information included in the virtual network interface addition notification packet, the computer 11B obtains virtual channels allocable to the physical channels and updates the virtual channel table 16.

In the step S606, the computer 11B transmits a virtual channel ID list notification packet for all virtual NICs connectable with each other over the physical NICs 15 engaged in receiving the broadcast packets In the steps S607 to S610, the virtual network interface addition notification packet creates a physical channel and a virtual channel as the computer 11B does.

In the steps S611 to S615, virtual channel ID for uniquely identifying the virtual channel between the two computers is generated and both the computers 11A and 11B update the tables.

Through the above-described processing, a pair of physical NICs 15 connectable with each other (physical channel) between the computers 11A and 11B, a pair of virtual NICs (virtual channel) allocable to the physical channel formed by the pair of physical NICs 15, and virtual channel ID for uniquely identifying the virtual channel can be generated automatically.

In this way, by the processing of FIG. 7, a physical channel and a virtual channel are automatically configured between the two computers 11 and physical channel information and virtual channel information are made coincident and shared between the two computers 11.

Next, virtual NIC deletion processing described.

FIG. 8 is a sequence diagram of virtual NIC deletion processing according to an embodiment of the invention.

In the sequence diagram of FIG. 8, in the virtual network including two computers 11A and 11B, virtual NICs already registered on the computers 11A and 11B are deleted.

First, the administrative packet processor 133 on the computer 11A transmits a virtual network interface deletion notification packet as an administrative packet by broadcasting (step S701).

Deletion of a virtual NIC is requested by, for example, the administrator or a request from the host operating system, management program, and the like, as noted above.

The virtual network interface deletion notification packet 804 (see FIG. 9D) includes source physical network address, destination physical network address, packet identifier, and source virtual network address.

The source virtual network address indicates the virtual NIC network address that is deleted. The packet identifier fields contains an identifier indicating "deletion notification". By this identifier, the virtual NIC processor 131 at the receiving side can identify this packet as the virtual network interface deletion notification packet.

On the computer 11B, the virtual NIC processor 131 receives the virtual network interface deletion notification packet transmitted by broadcasting (step S702). This received packet is found to be an administrative packet and the administrative packet processor 133 executes subsequent processing.

The administrative packet processor 133 on the computer 11B refers to the virtual channel table 16 stored in the storage 18 of its own computer and selects a virtual channel (hereinafter referred to as virtual channel x) record having a pair of the source virtual network address included in the received virtual network interface deletion notification packet and the virtual network address of a virtual NIC on its own computer. The selected record is deleted from the virtual channel table (step S703).

Then, the administrative packet processor 133 refers to the physical channel table 17 stored in the storage 18 of its own computer and retrieves virtual channel IDs from the fields of virtual channel IDs allocable 403 and virtual channel ID allocated 404. Among the retrieved virtual channel IDs, all entries of the virtual channel corresponding to the virtual channel ID of the virtual channel x are deleted (step S704).

Then, the administrative packet processor 133 on the computer 11B refers to the physical channel table 17 and selects all physical channels for which no value is set in the field of virtual channel ID allocated 403, that is, physical channels to which no virtual channel has been allocated. The selected physical channels are deleted from the physical channel table 17 (step S705).

In this way, by the processing of FIG. 8, a virtual channel is deleted and physical channels to which only the deleted virtual channel has been allocated are also deleted between the two computers 11.

Next, physical channel allocation processing is described in which a virtual channel is allocated to physical channels in the step S525 in FIG. 5.

Figure 10:
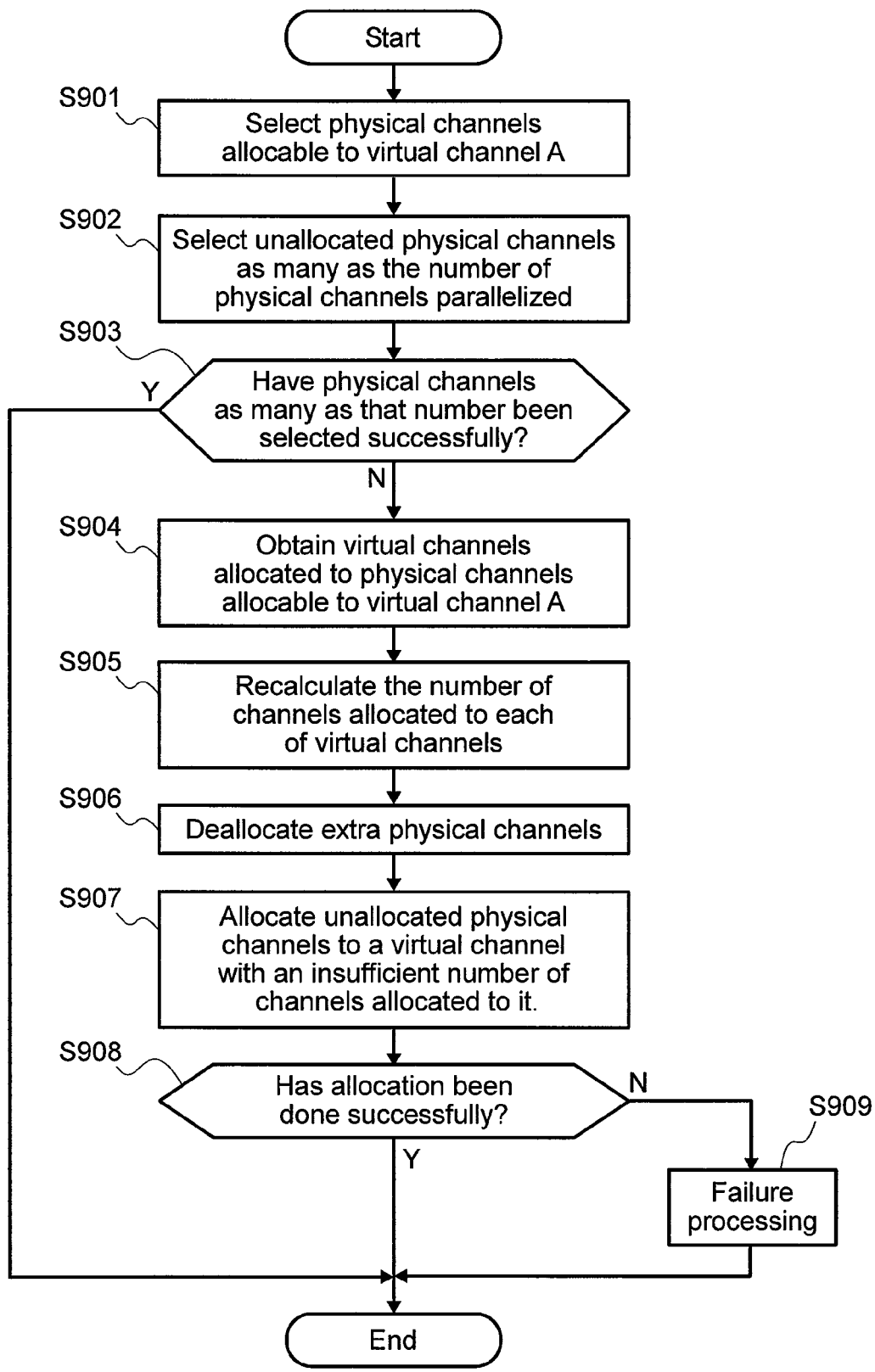
FIG. 10 is a flowchart of physical channel allocation processing according to an embodiment of the invention.

FIG. 10 is a flowchart of physical channel allocation processing according to an embodiment of the invention.

When the virtual NIC processor 131 transfers a packet to a virtual NIC belonging to a virtual channel (FIG. 5), if no physical channel is allocated to the virtual channel, the flowchart shown in FIG. 10 is executed (step S525 in FIG. 4).

Here, a virtual channel for which the processing is performed is assumed to be "virtual channel A".

First, the virtual NIC processor 131 refers to the physical channel table 17 and selects physical channel records in which the ID of the virtual channel A is included in the virtual channel IDs allocable (step S901).

Then, the virtual NIC processor 131 selects records in which no value is registered in the field of virtual channel ID allocated from among the selected physical channels. At this time, the virtual NIC processor refers to the virtual channel table 16 and obtains the number of physical channels parallelized from the virtual channel priority control information 304 for the record of virtual channel ID that can be assigned to the virtual channel A. The virtual NIC processor selects physical channels as many as the number of physical channels parallelized (step S902).

More specifically, physical channels are selected randomly from among the physical channels in which no value is registered in the field of virtual channel ID allocated. Here, the physical channels thus selected are referred to as physical channels (I). The physical channels allocable to the virtual channel A are referred to as physical channels (II).

Then, the virtual NIC processor 131 determines whether it is possible to select physical channels as many as the number of physical channels parallelized in the step S902 (step S903).

If the physical channels have been selected successfully, processing as will be described later in FIG. 11 is performed for each physical channel. Otherwise, if only physical channels fewer than the number of physical channels parallelized are selected, steps S904 to S909 are executed.

At step S904, the virtual NIC processor 131 selects virtual channels Bi (i=1 . . . n) registered in the field of channel ID allocated from among the physical channel records selected in the step S901.

Then, the virtual NIC processor 131 refers to the virtual channel table 16 and obtains a network weighting value (Bi) for each of virtual channels B selected in the step S904. It also obtains a network weighting value (A) for the virtual channel A.

Here, given that N denotes the total number of physical channels (II), NA denotes the number of virtual channels that are allocated to virtual channel A, NBi denotes the number of virtual channels that are allocated to virtual channels Bi, XBi denotes a value of "the number of physical channels parallelized (Bi)×network weighting (Bi)×virtual channel use frequency 305 (Bi)" for virtual channels Bi, EXBi denotes summation of XBi values of all virtual channels, and UBi denotes an average of "virtual channel use frequency 305 (Bi)" values for all virtual channels Bi, NA and NBi are calculated by the following equations (step S905):

$NA = N \times \text{network weighting value } (A) \times UBi \div (\text{network weighting } (A) + \Sigma XBi)$ $NBi = N \times XBi \div (\text{network weighting } (A) + \Sigma XBi)$ (However, a fractional part is rounded to the nearest whole number and a calculated value less than one is rounded up to one.)

Then, the virtual NIC processor 131 reallocates physical channels to virtual channels, so that the number of physical channels allocated to virtual channel B and the number of physical channels allocated to virtual channel A are equal to NA and NBi, respectively, obtained in the step S905, through the following steps S906 to S908.

First, the virtual NIC processor 131 compares the number of physical channels currently allocated Mx and Nx calculated in the step S905 for a difference for each of virtual channels x (x=A, B1 . . . Bn). If Mx>Nx, the virtual NIC processor randomly selects (Mx−Nx) physical channels from among the physical channels allocated to virtual channels x. It deletes data in the field of channel ID allocated for the selected physical channels. It adds the selected physical channels to the physical channels (I) selected in the step S902 (step S906).

At this time, for physical channels (I), no value is registered in the field of virtual channel ID allocated, and the IDs of virtual channels x are listed in the field of virtual channel IDs allocable.

Then, the virtual NIC processor 131 compares the number of physical channels currently allocated Mx and Nx calculated in the step S905 for a difference for each of virtual channels x (x=A, B1 . . . Bn). If Nx>Mx, it selects (Nx−Mx) physical channels from among the physical channels (I).

The virtual NIC processor 131 creates a list of its own computer's physical network addresses and other computer's physical network addresses of the physical channels allocated to virtual channels x. The virtual NIC processor searches for a physical channel record with its own computer's physical network address 401 and other computer's physical network address 402 not found in any list. As a result of the search, if such a physical channel is found, the physical channel is selected preferentially.

If there are a plurality of candidates to select, the virtual NIC processor 131 randomly selects a physical channel or preferentially selects a physical channel found earlier. If, for example, physical channels are randomly selected, on the physical channels involved in a virtual channel, data communication is performed between different physical NICs 15.

When a physical channel is selected, the virtual NIC processor 131 changes the channel ID allocated included in the physical channel record to the ID of the virtual channel x physical channel. Thereby, the physical channel is allocated to the virtual channel (step S907).

Then, the virtual NIC controller 131 determines whether allocation of a virtual channel to a physical channel has been done successfully in the steps S906 and S907 (step S908).

If there is no physical channel allocated to virtual channel A, the virtual NIC processor 131 regards the allocation of a virtual channel to a physical channel as being failed, performs failure processing such as error notification, and terminates the processing according to this flowchart.

If the allocation of a virtual channel to a physical channel has been done successfully and a physical channel[a] has been allocated to virtual channel A, the virtual NIC processor terminals the processing according to this flowchart and returns to the flowchart of FIG. 5.

At this time, the administrative packet processor 133 executes allocated channel ID update processing (FIG. 11) to update the information for channel ID allocated associated with the physical channel [a] in the physical channel table 17 on the packet transmitting side computer and the packet receiving side computer.

Through the above-described processing, the virtual channel A is allocated to the physical channel[a]. In consequence, a packet received by a physical NIC 15 belonging to the physical channel[a] is controlled to be passed to a virtual NIC belonging to the virtual channel A.

FIG. 11 is a sequence diagram of allocated channel ID update processing according to an embodiment of the invention.

When the allocation of a virtual channel to a physical channel has be done successfully in the step S908 of FIG. 10, the administrative packet processor 133 changes the virtual channel ID allocated associated with the physical channel in the physical channel table 171 to the ID of the virtual channel A (step S1001).

Then, the administrative packet processor 133 transmits a virtual channel allocation notification packet as an administrative packet 805 addressed to the other computer's physical network address of the allocated physical channel (step S1002).

The virtual channel allocation notification packet 805 (see FIG. 9E) includes source physical network address, destination physical network address, packet identifier, and virtual channel ID allocated to the physical channel.

The packet identifier field contains an identifier indicating "ID update". By this identifier, the virtual NIC processor 131 at the receiving side can identify this packet as the virtual channel allocation notification packet.

On the computer 11B, the virtual NIC processor 131 receives the virtual channel allocation notification packet transmitted (step S1003). This received packet is found to be an administrative packet and the administrative packet processor 133 executes subsequent processing.

The administrative packet processor 133 at the receiving side refers to the physical channel table 17 and selects a physical channel in which the destination physical network address matches with the source physical network address included in the received virtual channel allocation notification packet. Then, the administrative packet processor updates the channel ID allocated in the selected physical channel record to the virtual channel ID included in the virtual channel allocation notification packet (step S1004).

Then, the administrative packet processor 133 at the receiving side generates a channel allocation response packet addressed to the source physical network address included in the virtual channel allocation notification packet and transmits the generated packet (step S1005)

The virtual NIC processor 131 at the transmitting side receives the virtual channel allocation response packet transmitted (step S1006). This received packet is found to be an administrative packet and the administrative packet processor 133 and the virtual NIC processor 131 execute the processing. That is, by receiving the channel allocation response packet, it is verified that virtual channel allocation is completed and the physical channel table 17 has been updated.

If the transmitting-side computer 11 transmits a data packet before verifying that the physical channel table 17 at the receiving side has been updated, the addresses of the data packet might be mistranslated by making reference to incorrect information in the physical channel table 17 in case a packet over-take occurs.

Therefore, at step S1004, the virtual NIC processor 131 at the transmitting side stops data packet transmission and waits until receiving the virtual channel allocation response packet transmitted by the administrative packet processor 133 at the receiving side.

A virtual channel allocation packet may be included in a part of a data packet which is transmitted by the virtual NIC processor 131 instead of being separately transmitted as an administrative packet.

For example, the virtual NIC processor 131 may include virtual channel ID information in a VLAN ID tag and a data packet with the VLAN ID may be used to provide data indicating the virtual channel ID as well.

In the case of using this method, when the virtual NIC processor 131 at the receiving side detects that the VLAN tag including VLAN ID is attached to the packet in the step S510 in FIG. 7, the virtual NIC processor 131 at the receiving side internally generates a virtual channel allocation notification packet based on the contents of the data packet. The generated packet is passed to the administrative packet processor 133.

More specifically, the virtual NIC controller 131 generates a virtual channel allocation notification packet with the virtual channel ID value as the VLAN ID, including source physical network address, destination physical network address, packet identifier, and virtual channel ID.

Particularly when a data packet with the VLAN tag is transmitted as apart of a message together with other ordinary data packets, it is avoided that an overtaking data packet is received before the data update in the physical channel table 17. In comparison with execution of the processing of FIG. 11 by transmitting an administrative packet, the steps S1005 and S1006 can be skipped and the transmitting-side computer does not need to wait for a response from the receiving-side computer 11 before transmitting a data packet.

In the case of using the VLAN tag, however, the system must be configured so that virtual channel IDs allocable across physical channels can be controlled using corresponding VLAN IDs.

In the present invention, as already described, when building a virtual network at each computer 11, the administrator of the computer first defines virtual NICs.

When the above definition has been performed, the virtual NIC processor 131 transmits a virtual network interface addition notification packet and the physical channel table 17 and the virtual channel table 16 on each of the computers in the virtual network are updated.

Then, when an application program 12 intends to perform packet transmission between virtual NICs identified by a virtual channel, the transmission and reception processing starts as illustrated in FIG. 5. In the step S505, if a physical channel has not been allocated to a virtual channel, allocation of a physical channel to a virtual channel is performed according to the flowcharts shown in FIGS. 10 and 11.

Thereafter, the processing in FIG. 5 continues and packets are transferred over physical NICs 15 associated with one or more physical channels allocated to a virtual channel to other computer's NICs.

In this way, channel definition and physical channel interface configuration are executed transparently from application programs 12 and large-bandwidth data transfer can be realized by transferring data through the use of a plurality of physical NICs parallelized.

In the environment where two or more computers are connected by a plurality of NICs and over an arbitrary network configuration, the network system according to the invention provides parallel data transfer between two computers using a plurality NICs and realizes data transmission at a larger bandwidth than transfer over a single NIC. Furthermore, the network system according to the invention carries out transmission using a plurality of NICs which are, however, transparent to application programs on a computer, so that an application program can handle data transfer over a single NIC.

In the network system according to the invention, a control program at a lower layer takes a major role, which intercepts a packet transfer task issued from an existing application program to an NIC and distributes it to a plurality of NICs in a parallel manner. Such a control program may be a device driver for an operating system or a virtual NIC control program that emulates access to NICs on virtual computers in a virtual computer system where a computer is divided into a plurality of virtual computers.

According to the invention, a plurality of NICs can be handled as a single virtual NIC without modifying an existing application program. A control system of a computer can perform allocation of a physical NIC to a virtual NIC and can reconfigure allocations according to the usage of virtual NICs without notifying application programs of allocation and reallocation results. For example, a virtual NIC with a low usage rate may be allocated to a virtual NIC of higher priority and the network operation efficiency can be enhanced.

What is claimed is:

1. In a network system comprising a first computer and a second computer, each having plural physical network interfaces (PNICs), and a network connecting said first computer and said second computer, wherein the first computer and the second computer can communicate with each other over said PNICs, a method for configuring a virtual network between said first computer and said second computer, the method comprising:

at each of said first computer and said second computer,
configuring a more than one virtual network interface (VNIC) to be used for data transmission and reception;
setting up a virtual channel identified by a pair of a VNIC identifier configured by said first computer and a VNIC identifier configured by said second computer, and storing a correspondence between said set up virtual channel, said VNIC identifier configured by said first computer and said VNIC identifier configured by said second computer as virtual channel information;
setting up a physical channel identified by a pair of a first computer PNIC identifier and a second computer PNIC identifier, and storing a correspondence between said set up physical channel, said first computer PNIC identifier and said second computer PNIC identifier as physical channel information;
at said first computer which is a source,
when detecting a packet including a transmission instruction for said VNIC configured by said first computer,
referring to said virtual channel information of said first computer,
searching for one of said virtual channels identified by one said pair of said VNIC identifiers included in said packet based on said virtual channel information of said first computer, one of said VNIC identifiers being a destination VNIC identifier, and the other of said identifiers being a source VNIC identifier,
referring to said physical channel information of said first computer,
selecting said physical channel corresponding to said one virtual channel based on said physical channel information of said first computer,
translating said source VNIC identifier included in said packet into said first computer PNIC identifier corresponding to said selected physical channel,
translating said destination VNIC identifier included in said packet into said second computer PNIC identifier corresponding to said selected physical channel,
transmitting said translated packet from said first computer PNIC corresponding to said selected physical channel to said second computer PNIC corresponding to said selected physical channel,
at said second computer which is a destination,
when detecting said translated packet via said second computer PNIC,
referring to said physical channel information of said second computer,
searching for said physical channel identified by one said pair of PNIC identifiers included in said packet based on said physical channel information of said second computer, one of said PNIC identifiers being said first computer PNIC identifier corresponding to said searched physical channel, and the other of said PNIC identifiers being said second computer PNIC identifier corresponding to said searched physical channel,
selecting said virtual channel corresponding to said searched physical channel,
referring to said virtual channel information of said second computer, translating said first computer PNIC identifier included in said packet into an first computer VNIC identifier corresponding to said selected virtual channel based on said virtual channel information of said second computer,
translating said second computer PNIC identifier included in said packet into a second computer VNIC identifier corresponding to said selected virtual channel based on said virtual channel information of said second computer, and
notifying to said VNIC configured by said second computer that said translated packet has been received via said second computer PNIC.

2. The method for configuring a virtual network of claim 1, wherein:

said first computer, upon configuring said virtual network interface, broadcasts a notification of said virtual network interface addition information, and
said second computer, upon receiving the notification of said virtual network interface addition information, sets a correspondence between said virtual channel and one or more said physical channels, based on predetermined priority of said virtual channel and statistical information stored, and stores the correspondence between said virtual channel and said one or more physical channels in said physical channel information.

3. A network system comprising a first computer and a second computer, each having plural physical network interfaces (PNICs), and a network connecting said first computer and said second computer, wherein the first computer and the second computer communicate with each other over said PNICs, each of said first and second computers comprising:
a CPU that supports operation of a virtual network facility that manages at least one virtual network interface (VNIC) for each of said first computer and said second computer; and
a storage for storing information about said VNICs,
wherein
the virtual network facility of said first computer:
configures each said VNIC to be used for data transmission and reception by an application running on said first computer;
sets up a virtual channel identified by a pair of a VNIC identifier configured by said first computer and a VNIC identifier configured by said second computer and stores a correspondence between said set up virtual channel, said VNIC identifier configured by said first computer and said VNIC identifier configured by said second computer as virtual channel information into said storage;
sets up a physical channel identified by a pair of a first computer PNIC identifier and a second computer PNIC identifier, and stores a correspondence between said set up physical channel, said first computer PNIC identifier and said second computer PNIC identifier as physical channel information into said storage;
wherein said virtual network facility of said first computer which is a source,
when detecting a packet including a transmission instruction for said VNIC configured by said virtual network facility of said first computer,
refers to said virtual channel information of said first computer,
searches for one of said virtual channels identified by one said pair of said VNIC identifiers included in said packet based on said virtual channel information of said first computer, one of said VNIC identifiers being a destination VNIC identifier, and the other of said identifiers being a source VNIC identifier,
refers to said physical channel information of said first computer,
selects said physical channel corresponding to said one virtual channel based on said physical channel information of said first computer,
translates said source VNIC identifier included in said packet into said first computer PNIC identifier corresponding to said selected physical channel,
translates said destination VNIC identifier included in said packet into said second computer PNIC identifier corresponding to said selected physical channel,
transmits said translated packet from said first computer PNIC corresponding to said selected physical channel to said second computer PNIC corresponding to said selected physical channel,
wherein said virtual network facility of said second computer which is a destination,
when detecting said translated packet via said second computer PNIC,
refers to said physical channel information of said second computer,
searches for said physical channel identified by one said pair of PNIC identifiers included in said packet based on said physical channel information of said second computer, one of said PNIC identifiers being said first computer PNIC identifier corresponding to said searched physical channel, and the other of said PNIC identifiers being said second computer PNIC identifier corresponding to said searched physical channel,
selects said virtual channel corresponding to said searched physical channel,
refers to said virtual channel information of said second computer,
translates said first computer PNIC identifier included in said packet into an first computer VNIC identifier corresponding to said selected virtual channel based on said virtual channel information of said second computer,
translates said second computer PNIC identifier included in said packet into a second computer VNIC identifier corresponding to said selected virtual channel based on said virtual channel information of said second computer, and
notifies to said VNIC configured by said second computer that said translated packet has been received via said second computer PNIC.

4. The network system of claim 3, wherein:
the virtual network facility of said first computer, upon configuring said virtual network interface, broadcasts a notification of said virtual network interface addition information, and
the virtual network facility of said second computer, upon receiving the notification of said virtual network interface addition information, sets a correspondence between said virtual channel and one or more said physical channels, based on predetermined priority of said virtual channel and said statistical information measured, and stores the correspondence between said virtual channel and said one or more physical channels in said physical channel information stored in said storage.

5. The network system of claim 3, wherein:
when transmitting the correspondence between said virtual channel and said one or more physical channels to the computer having the virtual network interface to which said data transmission instruction is addressed, the virtual network facility of said first computer attaches an identifier indicating said correspondence to a packet of data in accordance with said data transmission instruction and transmits the packet to the computer having the virtual network interface to which said data transmission instruction is addressed.

* * * * *